(12) United States Patent
Hengstler et al.

(10) Patent No.: US 11,860,019 B2
(45) Date of Patent: Jan. 2, 2024

(54) FIELD DEVICE WITH DISPLAY MEANS FOR THE VISUAL REPRESENTATION OF DETERMINED STATES, AND METHOD

(71) Applicant: VEGA GRIESHABER KG, Wolfach (DE)

(72) Inventors: Clemens Hengstler, Haslach (DE); Matthias Schmidt, Schonach (DE); Florian Krämer, Mühlenbach (DE); Patrick Heizmann, Oberwolfach (DE); Stefan Allgaier, Oberwolfach (DE)

(73) Assignee: VEGA GRIESHABER KG, Wolfach (DE)

( * ) Notice: Subject to any disclaimer, the term of this patent is extended or adjusted under 35 U.S.C. 154(b) by 136 days.

(21) Appl. No.: 17/702,132

(22) Filed: Mar. 23, 2022

(65) Prior Publication Data

US 2022/0316934 A1 Oct. 6, 2022

(30) Foreign Application Priority Data

Mar. 31, 2021 (DE) ...................... 10 2021 108 255.2

(51) Int. Cl.
*G01F 23/18* (2006.01)
*G09F 9/33* (2006.01)

(52) U.S. Cl.
CPC .............. *G01F 23/18* (2013.01); *G09F 9/335* (2021.05)

(58) Field of Classification Search
CPC ........... G01F 25/20; G01F 25/22; G01F 25/24
See application file for complete search history.

(56) References Cited

U.S. PATENT DOCUMENTS

| | | | | |
|---|---|---|---|---|
| 2007/0085761 A1* | 4/2007 | Schoen | ................. | H01H 9/161 345/80 |
| 2011/0270611 A1* | 11/2011 | Nishimura | ............... | F16N 29/00 704/E17.001 |
| 2019/0274780 A1* | 9/2019 | Nowatschin | ............. | B25J 13/02 |

FOREIGN PATENT DOCUMENTS

| | | | | |
|---|---|---|---|---|
| DE | 20122094 U1 | 4/2004 | | |
| DE | 102007043664 A1 | 9/2007 | | |
| DE | 102007043664 A1 * | 4/2009 | ............. | G01D 18/00 |
| DE | 102016222637 B3 | 11/2016 | | |
| DE | 102016104321 A1 * | 9/2017 | | |
| DE | 102017123820 A1 | 10/2017 | | |
| DE | 102016222637 B3 * | 2/2018 | | |
| DE | 102018219371 A1 | 11/2018 | | |
| DE | 102919122343 A1 | 8/2019 | | |
| EP | 02740114 B1 | 7/2012 | | |
| EP | 3029645 A1 * | 6/2016 | ............. | B60K 35/00 |
| JP | 2018106389 A | 7/2018 | | |

(Continued)

OTHER PUBLICATIONS

Betriebsanleitung Binärer Füllstandsensor (Operating Instructions Binary Level Sensor) LI513x; ifm electronic gmbh document; dated Mar. 2020.

(Continued)

*Primary Examiner* — Herbert K Roberts
(74) *Attorney, Agent, or Firm* — William Gray Mitchell (57) ABSTRACT

A field device with display means for the visual representation of states determined by the field device, wherein at least two display means are provided, which are each configured in a ring-shaped or ring-segment-shaped manner, as well as a method for the visual representation of states determined by a field device.

14 Claims, 3 Drawing Sheets

(56) References Cited

FOREIGN PATENT DOCUMENTS

| WO | WO2019243368 | 6/2019 |
| WO | WO-2019243368 A1 * | 12/2019 |

OTHER PUBLICATIONS

Gerätehandbuch Ventilsensor (Device manual valve sensor) MVQ101; ifm electronic gmbh document dated Apr. 2018.

Besser ohne Schwimmer: Füllstand kapazitiv und wartungsfrei messen (Better without a float: Measure the fill level capacitively and maintenance-free) LI5131; ifm electronic gmbh document dated Nov. 20, 2020.

Kontinuierliche Positions—rückmeldung mit Diagnosefunktion (Continous position feedback with diagnostic function) MVQ101; ifm electronic gmbh document dated Nov. 20, 2018.

GPTO office actions for related German application 10 2021 108 255.2 dated Jun. 29, 2021.

GPTO office actions for related German application 10 2021 108 255.2 dated Mar. 4, 2022.

* cited by examiner

FIELD DEVICE WITH DISPLAY MEANS FOR THE VISUAL REPRESENTATION OF DETERMINED STATES, AND METHOD

CROSS REFERENCE TO RELATED APPLICATIONS

This patent application claims priority to German Patent Application 102021108255.2, filed on Mar. 31, 2021.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The invention comprises a field device with display means for the visual representation of determined states, and method.

Background of the Invention

Field devices that serve for determining process quantities/process variables are often used in process automation engineering. Filling level measuring devices, limit level measuring devices and pressure measuring devices with sensors determining the respective process quantities filling level, limit level or pressure are examples of such field devices. Such field devices are frequently connected to higher-level units, e.g. to guidance systems or control systems. These higher-level units serve for controlling, visualizing and/or monitoring processes.

The energy and/or signal transmission between the field device and higher-level units is frequently carried out in accordance with the known 4 . . . 20 mA standard, in which a 4 . . . 20 mA current loop or a two-wire line is formed between the field device and the higher-level unit. In addition to the analog transmission of signals, there is the option of the measuring devices transmitting further information to the higher-level unit, or receiving it therefrom, in accordance with various other protocols, particularly digital protocols. The HART protocol or the Profibus PA protocol may be mentioned as examples in this respect. Furthermore, the supply and digital communication may also be realized in accordance with the two-wire standard APL (APL=Advanced Physical Layer), which is currently under development and based on Ethernet.

The electronics unit of such a field device generally has various status displays, in particular status lights, which are generally configured as LEDs. Information on, for example, a power supply of the device, a device failure, a device status or binary switching states is outputted by means of the status displays.

There is an increasing interest in being able to read out such status displays not only in a process control center or directly on the field device, but also make them readable in the field from a greater distance. In addition, there is an increasing demand for the capability of visually representing several pieces of information on the field device at the same time, since a prioritization of information to be depicted, which, otherwise, has to be planned and programmed in advance, can be omitted.

For example, a device for wirelessly determining and visually representing the operational state of a field device is known from DE 10 2017 123 820 A1.

Against this background, the invention is based on the object of providing a field device with display means for visually representing states, as well a method for visually representing states of a field device, which are safely and reliably readable from a greater distance in the field. In addition, the amount of information to be depicted on the field device is to be increased.

This object is accomplished by a field device and a method, each having the features described herein.

BRIEF SUMMARY OF THE INVENTION

In a preferred embodiment, a field device (1, 10, 15, 20) with display means (2, 3, 4, 16, 21) for the visual representation of states determined by the field device (1, 10, 15, 20), characterized in that at least two display means (2, 3, 4, 16, 21) are provided, which are each configured in a ring-shaped or ring-segment-shaped manner.

In another preferred embodiment, the field device (1, 10, 15, 20) as described herein, characterized by a housing (5) on which the display means (2, 3, 4, 16, 21) are disposed so as to extend on the outer circumference.

In another preferred embodiment, the field device (1, 10, 15, 20) as described herein, characterized in that an angular extent of the ring-segment-shaped display means is at least 120°, more preferably at least 180°, and still more preferably 270°.

In another preferred embodiment, the field device (1, 10, 15, 20) as described herein, characterized in that the display means (2, 3, 4, 16, 21) is configured as a multi-color lighting means, preferably as a multi-color light-emitting diode or organic multi-color light-emitting diode or color display.

In another preferred embodiment, the field device (1, 10, 15, 20) as described herein, characterized in that the multi-color light-emitting diode is an RGB light-emitting diode.

In another preferred embodiment, the field device (1, 10, 15, 20) a as described herein, characterized in that the display means (2, 3, 4, 16, 21) is configured and controlled to visualize the determined states by means of a color progression or by means of different colors assigned to the respectively determined states.

In another preferred embodiment, the field device (1, 10, 15, 20) as described herein, characterized by at least one sensor (6, 12, 17) for determining a process quantity, wherein at least one of the display means (2, 3, 16, 21) is configured and controlled to visualize a state of the determined process quantity.

In another preferred embodiment, the field device (1, 10, 15, 20) as described herein, characterized in that the sensor is a limit level sensor (6), a pressure sensor (12) or a filling level sensor (17).

In another preferred embodiment, the field device (1, 10, 15, 20) as described herein, characterized in that the limit level sensor (6) is configured for differentiating between at least two different media, wherein one of the display means (2) is configured and controlled to visualize whether a first or a second medium is detected, and the other display means (3) is configured and controlled to visualize whether no or a medium other than the first or second medium is detected.

In another preferred embodiment, the field device (1, 10, 15, 20) a as described herein, characterized in that the pressure sensor (12) is configured to differentiate between several switching points depending on the detected pressure, wherein one of the display means (2) is configured and controlled to visualize each of the several switching points by means of different colors.

In another preferred embodiment, the field device (1, 10, 15, 20) as described herein, characterized in that the filling level sensor (17) is configured for determining an interface layer between at least two media, wherein several of the display means (16) are configured and disposed together and controlled to visualize the detected overall filling level in a continuous or graded representation including the interface layer.

In another preferred embodiment, the field device (1, 10, 15, 20) as described herein, characterized in that at least one of the display means (4) is configured and controlled to visualize an operational status and/or one or several switching states of the field device (1, 10, 15, 20).

A method for the visual representation of states determined by a field device (1, 10, 15, 20), wherein the field device (1, 10, 15, 20) has display means (2, 3, 4, 16, 21), characterized in that the determined states are visualized by means of at least two display means (2, 3, 4, 16, 21) that are each configured in a ring-shaped or ring-segment-shaped manner.

In another preferred embodiment, the method as described herein, characterized in that the determined states are visualized by at least one of the display means (2, 3, 4, 16, 21) by means of a color progression or by means of different colors assigned to the respective states.

In another preferred embodiment, the method according as described herein, characterized in that a process quantity is determined by means of at least one sensor (6, 12, 17), and the state of the determined process quantity is visualized by at least one of the display means (2, 3, 16, 21).

DETAILED DESCRIPTION OF THE INVENTION

According to the invention, a field device has display means for the visual representation of states determined by the field device. Examples for such field devices include filling level measuring devices, limit level measuring devices, pressure measuring devices and the like, for determining respective process quantities, such as the filling level, limit level or pressure, without, however, being strictly limited thereto.

According to the invention, at least two display means are provided, which are each configured in a ring-shaped or ring-segment-shaped manner. In contrast to a ring segment, ring-shaped within the sense of the present invention is to be understood to mean a closed ring. The latter may describe a round, in particular circular shape, without, however, being strictly limited thereto. An angular, i.e. polygonal, ring or ring segment shape is also conceivable.

In any case, the ring or at least ring-segment-shaped extent of the display means ensures that the display means are clearly and reliably visible (e.g. to a user) even from a large distance in the field, e.g. a distance from the field device of one or a few meters up to about ten or some tens of meters, or when passing by. On the one hand, a large luminous surface of the display means that substantially extends across the entire ring or the entire ring segment is a contributing factor. In particular, the luminous surface may be a luminous surface that can be electrically excited to light up. In this case, the luminous surface may have several light-emitting diodes (LEDs) as lighting means, for example, which in their entirety form the visual impression of a contiguous luminous surface. The luminous surface may also be formed from an LED display, for instance. On the other hand, the ring or ring segment shape of the display means facilitates a visibility that is substantially independent of the actual angle of view. Since each ring or ring-segment-shaped display element is individually clearly and reliably recognizable even from a greater distance from the field device, it is also possible to arrange several such display means on the field device. In contrast, individual visual display means, such as individual LEDs, for example, cannot be reliably distinguished by a human eye already at a small distance from the field device. By arranging several ring or ring-segment-shaped display means, the amount of information that can be visually depicted on the field device and is always reliably recognizable even from a greater distance of some meters can be significantly increased. A prioritization of the information to be depicted, which is to be defined in advance (in case not all information can be depicted simultaneously due to the number of display means that can be provided) can be omitted in the field device according to the invention, which simplifies the development of the field device.

It may be pointed out that a prioritization of several pieces of information to be depicted by means of a single display means is not excluded by the invention and may be provided, depending on the specific application, in order to further increase the amount of information that can be depicted. According to the invention, due to the capability of simultaneously depicting different pieces of information by means of several display means, a prioritization can be avoided in favor of a simpler structure.

According to an advantageous embodiment of the invention, an angular extent of ring-segment-shaped display means, such as respective luminous surfaces, for instance, is preferably at least 120°, more preferably at least 180°, and still more preferably 270°.

According to another preferred embodiment, the display means are disposed on a housing of the field device so as to extend on the outer circumference thereof, in order to ensure the visibility of the display means is reliably provided under all possible angles of view. In other words, the luminous surface of the display means may be disposed on the housing of the field device so as to extend on the outer circumference, for example.

Preferably, the display means may be configured as a multi-color lighting means, particularly as a multi-color light-emitting diode (LED) or organic multi-color light-emitting diode (OLED). Particularly preferably, the multi-color light-emitting diode may be an RGB light-emitting diode. Accordingly, the information to be visualized by the display means may be coded by means of color, for example, which ensures a simple and reliable transmission of information from the field device to a user. With the same advantageous effect, the multi-color lighting means may, according to another preferred embodiment of the invention, also be configured as a ring or ring-segment-shaped (color) display. A luminous surface of the display means may be formed from several individual lighting means, e.g. LEDs, and thus appear like a contiguous illuminated surface of the display means.

The visual representation by means of the display means may take place continuously. Alternatively, the visual representation by the display means may have a pulse-pause ratio, i.e., the display means may flash intermittently. The display means may flash intermittently in a single color or also in several alternating colors in order to encode a corresponding piece of information.

An advantageous refinement of the subject matter of the invention provides that the display means is configured and controlled to visualize the determined states by means of a color progression or by means of different colors assigned to the respectively determined states. The color progression, in which a change starting from an initial or starting color to a target color with a different color tone, color saturation and/or color brightness takes place, is particularly suitable—without, however, being strictly limited thereto—for visually depicting a state that changes continuously or at least in several steps. For example, a filling level of a container (e.g. a process tank, a storage tank, a silo or a mobile container) may be illustrated by such a color progression, in which the color progression to be depicted by the display means changes, for example, from green (empty state) to red (full state), in a continuous or graded manner as the filling level rises. Thus, a critical value of a process quantity (in this case the filling level) may already be reliably recognized from a distance or in passing. In addition, it is possible to easily and intuitively check whether the difference between the current value of the process variable (filling level) and the limit value (container full) is still sufficient.

Another advantageous embodiment of the invention provides that the field device comprises at least one sensor, e.g. a radar, microwave, pressure sensor or the like, for determining a process quantity, e.g. the filling level, limit level, pressure or viscosity, wherein at least one of the display means is configured and controlled to visualize a state of the determined process quantity.

According to a preferred embodiment, the sensor is a limit level sensor, which is further configured for differentiating between at least two different media, wherein one of the display means is configured and controlled to visualize whether a first or a second medium is detected, and the other display means is configured and controlled to visualize whether no or a medium other than the first or second medium is detected.

According to another preferred embodiment, the sensor is a pressure sensor, which is configured to differentiate between several switching points depending on the detected pressure, wherein one of the display means is configured and controlled to visualize each of the several switching points by means of different colors.

According to yet another advantageous embodiment, the sensor is a filling level sensor, which further is configured for determining an interface layer between at least two media, wherein several of the display means are configured and disposed together and controlled to visualize the detected overall filling level in a continuous or graded representation including the interface layer. In order to depict the overall filling level, the several display means may, for example, be switched on one after the other as the filling level rises, wherein the two media may be depicted by different colors. Thus, the interface layer can be reliably recognized even from a greater distance.

According to a preferred refinement of the subject matter of the invention, at least one of the display means is configured and controlled to visualize an operational status of the field device. For example, the operational status to be depicted may be a power supply of the device, the switching state of one or several inputs/outputs, a device failure, a data connection or bus connection with a higher-level control center and/or further field devices, an analysis result, a service/maintenance state, a location identifier, a filling/emptying process and the like.

The display means may be switched on permanently, cyclically or per request (e.g. by a radio signal, a key switch, freely definable filling level or limit level changes).

According to another aspect of the invention, a method for the visual representation of states determined by a field device is disclosed, wherein the field device has display means and the determined states are visualized by means of at least two display means that are each configured in a ring-shaped or ring-segment-shaped manner. As was already mentioned herein, the display means may advantageously have a luminous surface that can be electrically excited to light up. The luminous surface may have several light-emitting diodes (LEDs) as lighting means, for example, which in their entirety form a contiguous luminous surface of the display means. The luminous surface may also be formed from an LED display, for example.

It is to be understood that, with regard to method-related definitions of terms and the effects and advantages of features of the method, reference may be made in full to the disclosure of corresponding definitions, effects and advantages of the field device according to the invention. Accordingly, disclosures contained herein regarding the field device according to the invention may also be used, mutatis mutandis, for defining the method according to the invention unless expressly excluded herein. Also, disclosures contained herein regarding the method according to the invention may also be used, mutatis mutandis, for defining the field device according to the invention. Thus, a repetition of explanations of features that are basically the same, their effects and advantages with regard to the device according to the invention and the method according to the invention may be omitted herein for the sake of a more compact description, without such omissions having to be interpreted as limitations.

In a preferred refinement, the determined states are visualized by at least one of the display means by means of a color progression or by means of different colors assigned to the respective states.

A process quantity, e.g. the filling level, limit level, pressure or viscosity, can be determined by means of at least one sensor, e.g. a radar, microwave, pressure sensor and the like, and the state of the determined process quantity can be visualized by at least one of the display means as described herein.

Additionally or alternatively, an operational status of the field device can be visualized by at least one of the display means.

DETAILED DESCRIPTION OF THE FIGURES

Figure 1:
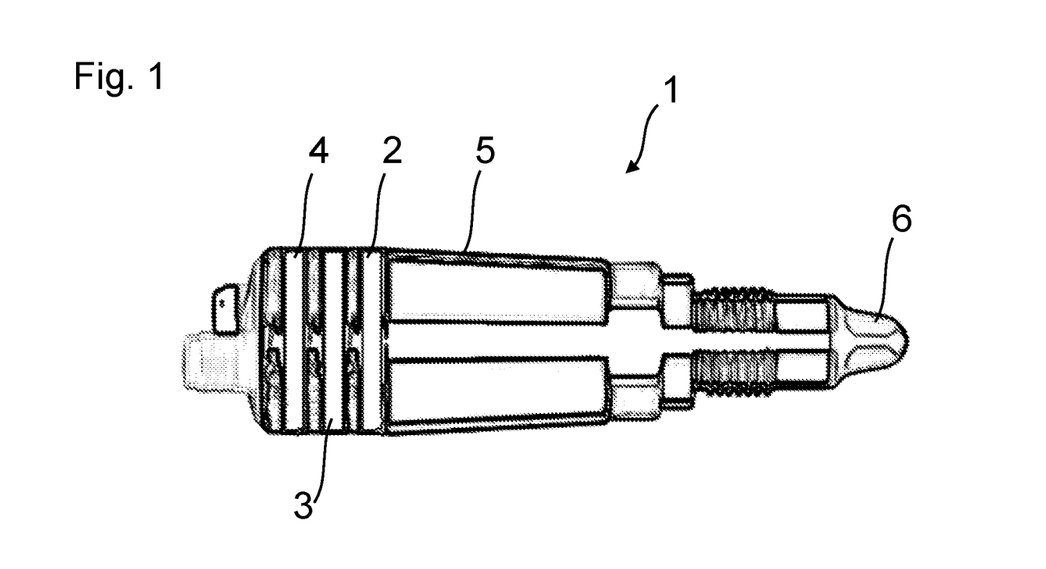
FIG. 1 is a line drawing evidencing a longitudinal side view of an exemplary embodiment of a field device according to the invention.

FIG. 1 schematically shows a longitudinal side view of an exemplary embodiment of a field device 1 with display means 2, 3, 4 for the visual representation of states determined by the field device 1 in accordance with the invention. In the example shown, all display means 2, 3, 4 each have a ring-shaped configuration and are disposed on a housing 5 of the field device 1 so as to extend on the outer circumference. In the present case, the display means each have a ring-shaped (or ring-segment-shaped) electrically controllable luminous surface.

In a case that is not shown, in which one or all display means 2, 3 and/or 4 are configured in a merely ring-segment-shaped manner, an angular extent of the ring-segment-shaped display means is at least 120°, more preferably at least 180°, and still more preferably 270°. The angular extent of the display means 2, 3 and 4 shown in FIG. 1 is 360°.

Each of the display means 2, 3 or 4 may be configured as a multi-color lighting means, preferably as a multi-color light-emitting diode or organic multi-color light-emitting diode. Particularly preferably, the multi-color light-emitting diode is an RGB light-emitting diode, without, however, being strictly limited thereto. The multi-color lighting means may also be configured in the shape of a ring or ring-segment-shaped (color) display.

In the exemplary embodiment shown, the field device 1 has a sensor 6, which in the present case is configured as a limit level sensor. The sensor 6 serves for determining a process quantity, in the present case at least one limit level of one medium or different media (not shown), wherein here, the display means 2 and 3 are configured and controlled to visualize a state of the determined process quantity (limit level, presence of the medium). As an example, the display means 4 in the field device 1 is configured and controlled to visualize an operational status of the field device 1.

In the present case, one, several or all of the display means 2, 3, 4 may be configured to visualize the process quantity and/or the operational status by means of different colors assigned to the respectively determined states. In the depicted exemplary embodiment of the field device 1, the limit level sensor 6 is configured for differentiating between several different media, and the display means 1 is configured and controlled to indicate whether a first medium or a second medium is detected by the sensor 6. Different colors may be assigned to the first and second media, which are signaled accordingly by the display means 2. In the present case, the display means 3 is configured and controlled to indicate whether no medium or a medium other than the first or second medium is detected the sensor 6. Also in this case, two different colors may be signaled by the display means 3. Advantageously, the colors visualized by the display means 3 are different from the colors visualized by the display means 2, so that a clear differentiation of the signaling by the display means 2 and 3 from each other is ensured even at a great distance, e.g. a distance from the field device 1 of one or a few meters, up to about ten or some tens of meters.

The operational state of the field device 1 signaled by the display means 4 may be, for example, a power supply of the field device 1, the switching state of one or several inputs/outputs, a device failure, a data connection or bus connection with a higher-level control center (not shown) and/or further field devices (also not shown), a service/maintenance state (e.g. for an imminent battery replacement if the field device 1 is supplied by a battery), a filling/emptying process of a container (not shown) containing the medium to be monitored, and the like. Different colors may be provided for the different states to be depicted.

The visual representation by means of the display means 2, 3 or 4 may take place continuously. Alternatively, the visual representation by the display means 2, 3 or 4 may have a pulse-pause ratio, i.e., the display means 2, 3 and/or 4 may flash intermittently. The respective display means 2, 3, 4 may flash intermittently in a single color or also in several alternating colors in order to encode a corresponding piece of information.

The display means 2, 3, 4 may be switched on permanently, cyclically or per request (e.g. by a radio signal, a key switch, freely definable filling level or limit level changes), wherein the operating time of an autonomous, battery-powered operation of the field device can be extended in the case of a non-permanent visualization by the display means.

By means of their corresponding luminous surface, the ring-shaped display means 2, 3 and 4 facilitate a reliable visibility of the information signaled by them, even at a greater distance from the field device 1, which may be one or a few meters up to about ten or some tens of meters, for example. The visualization by the display means 2, 3, 4 can be reliably read even when passing by. Nevertheless, the clear distinguishability of the depicted information of the individual display means 2, 3, 4 despite a comparatively closely adjacent arrangement permits a large amount of information to be depicted on the field device 1.

Figure 2:
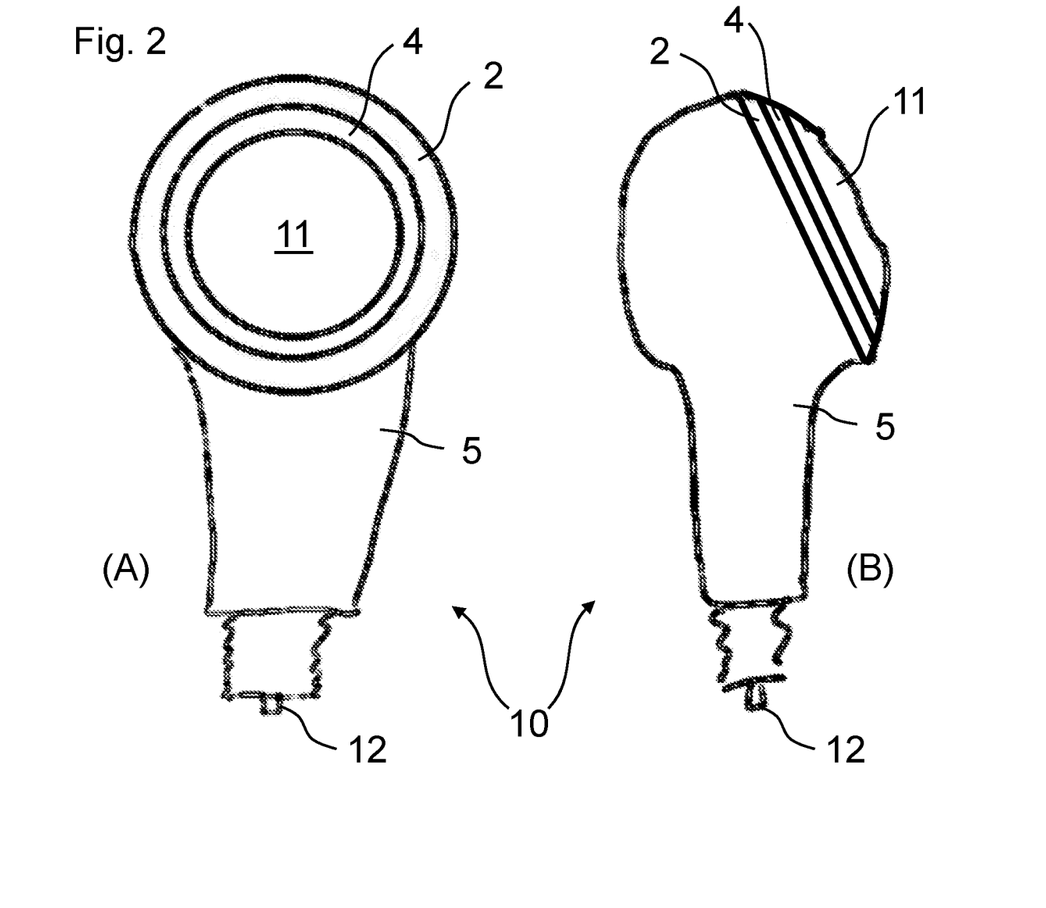
FIG. 2 is a line drawing evidencing a front and side view of another exemplary embodiment of a field device according to the invention.

FIG. 2 shows a front view A and a side view B of another exemplary embodiment of a field device 10 with ring-shaped display means 2 and 4 (e.g. with an electrically controllable luminous surface), which in the present case are configured similar to those of the field device 1 of FIG. 1, for the visual representation of states determined by the field device 10 in accordance with the invention. In addition, the field device 10 in the present case has a display 11 on which additional information in the form of text and/or graphics can be depicted. The display 11 is not absolutely necessary for carrying out the invention.

The field device 10 also has a sensor 12 for determining a process quantity, which in the present case is configured as a pressure sensor. In the field device 10, the pressure sensor 12 is configured to differentiate between several switching points depending on the detected pressure, wherein the display means 2 is configured and controlled to visualize each of the several switching points by means of different colors. The display means 4 is configured and controlled to depict a sensor status. Similar to the field device 1 from FIG. 1, different operational states of the field device 10, for example, a power supply of the field device 10, the switching state of one or several inputs/outputs, a device failure, a data connection or bus connection with a higher-level control center (not shown) and/or further field devices (also not shown), a service/maintenance state (e.g. a battery replacement), a filling/emptying process of a container (not shown) containing the medium to be monitored, and the like, may be visualized by the display means 4 via different colors.

The display means 2, 4 may be configured as a multi-color lighting means, preferably as a multi-color light-emitting diode or organic multi-color light-emitting diode. Particularly preferably, the multi-color light-emitting diode is an RGB light-emitting diode, without, however, being strictly limited thereto. Thus, the multi-color lighting means could also be configured in the shape of a ring or ring-segment-shaped (color) display.

The visual representation by means of the display means 2 or 4 may take place continuously. Alternatively, the visual representation by the display means 2, 4 may have a pulse-pause ratio, i.e., the display means 2 and/or 4 may flash intermittently. The respective display means 2, 4 may flash intermittently in a single color or also in several alternating colors in order to encode a corresponding piece of information.

The display means 2, 4 may be switched on permanently, cyclically or per request (e.g. by a radio signal, a key switch, freely definable pressure changes), wherein the operating time of an autonomous, battery-powered operation of the field device can be extended in the case of a non-permanent visualization by the display means.

Figure 3:
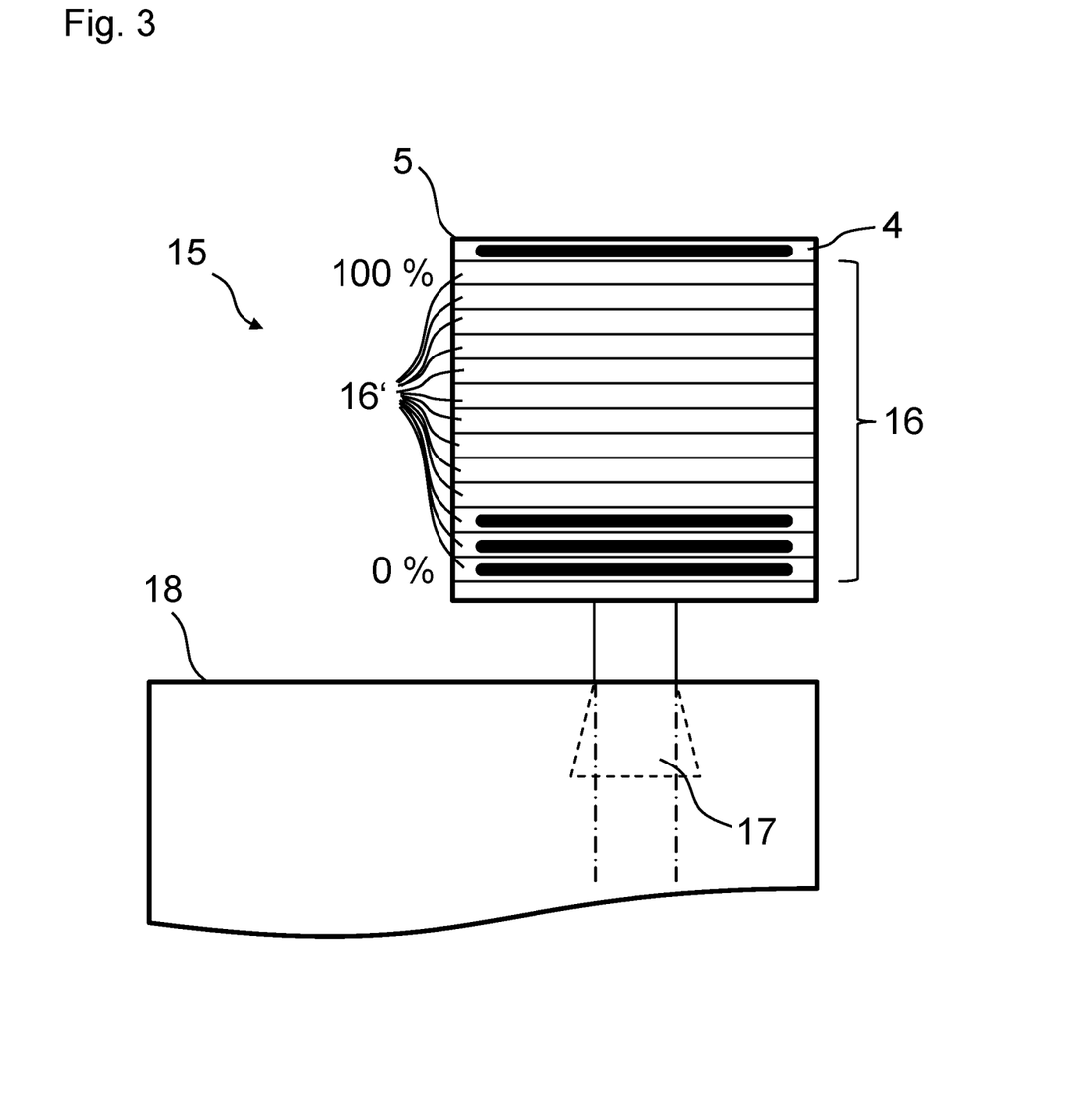
FIG. 3 is a line drawing evidencing a view of yet another exemplary embodiment of a field device according to the invention.

FIG. 3 shows a view of yet another exemplary embodiment of a field device 15 with display means 16 and 4 for the visual representation of states determined by the field device 15 in accordance with the invention. The display means 4 and 16 have a ring-shaped configuration and are disposed on a housing 5 of the field device 15 so as to extend on the outer circumference.

The field device 15 has a sensor 17, which in the present case is configured as a filling level sensor for detecting one or several media (not shown) that can be accommodated in a container 18. In particular, the filling level sensor 17 in the depicted example, e.g. a radar sensor, is configured for determining an interface layer between two media (not shown), wherein the display means 16 has an array consisting of several individual display means 16', which may have one luminous surface each and are configured and disposed together and controlled to visualize the detected overall filling level in a continuous or graded representation including the detected interface layer. For example, the interface layer may be visualized by the recognized first medium being depicted by the display means 16 in a different color than the second medium. In this way, both the overall filling level in the container 18 formed from both media and the interface layer can be read out reliably. It is to be understood that the radar sensor 17 may be an unimpededly radiating radar sensor as well as a sensor with a directed microwave, wherein the latter is particularly preferred for the accurate and reliable acquisition of an interface layer. Both options are schematically indicated in FIG. 3.

The display means 4 is configured and controlled similarly to the field devices 1 and 10 in order visualize an operational status of the field device 15.

The display means 16 or 16', 4 may be configured as a multi-color lighting means, preferably as a multi-color light-emitting diode or organic multi-color light-emitting diode. Particularly preferably, the multi-color light-emitting diode is an RGB light-emitting diode, without, however, being strictly limited thereto. It is also conceivable to configure the display means in the form of one or several (color) displays.

Figure 4:
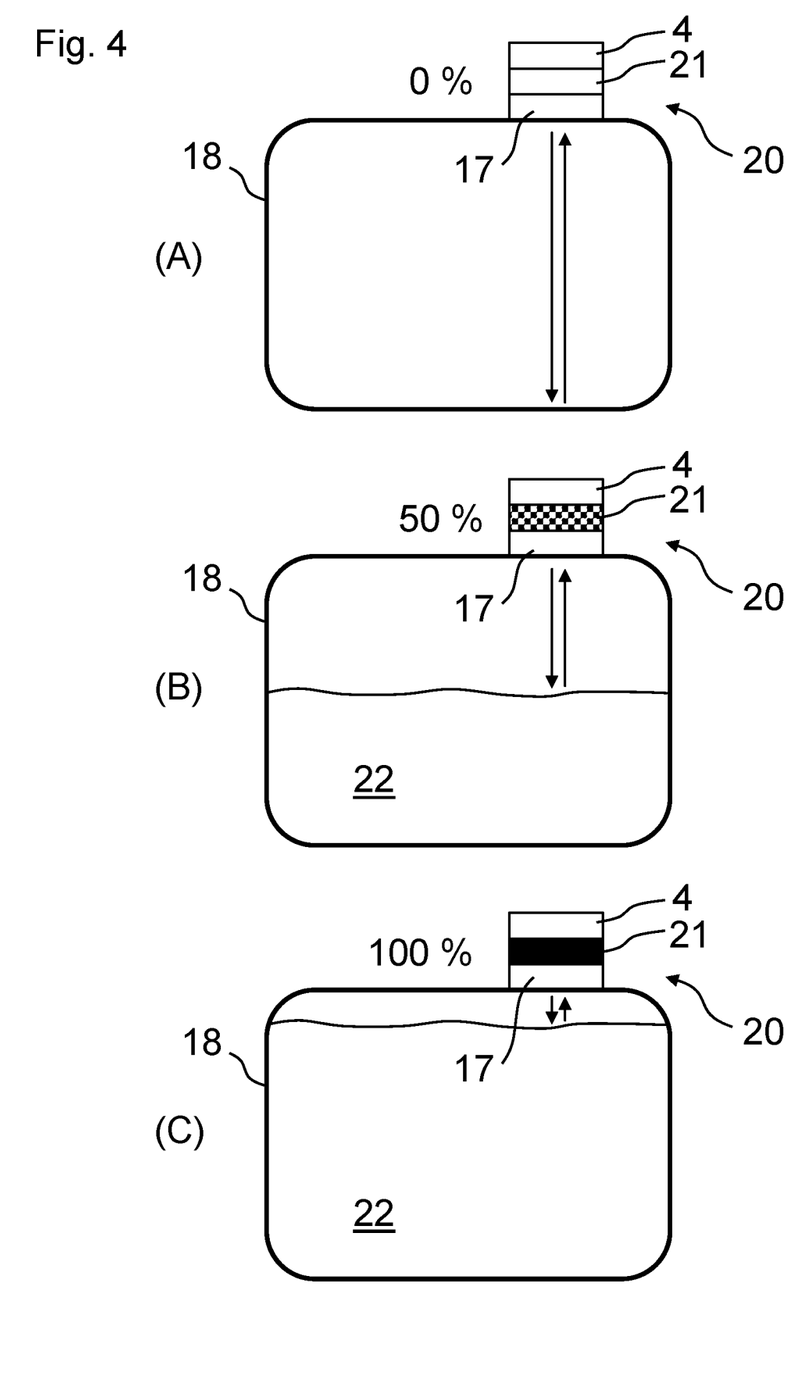
FIG. 4 is a line drawing evidencing three views of yet another exemplary embodiment of a field device according to the invention, in three different operational states.

FIG. 4 shows three views A, B, C of yet another exemplary embodiment of a field device 20 with display means 21 and 4 with a ring-shaped configuration for the visual representation (e.g. by means of corresponding luminous surfaces) of states determined by the field device 20 in accordance with the invention, in three different operational states.

Like the field device 15 from FIG. 3, the field device 20 also has a filling level sensor 17, e.g. a radar sensor, which in the present case is configured merely for determining a filling level of a medium 22 that can be accommodated in a container 18. In the depicted exemplary embodiment of the field device 20, the display means 21 is configured and controlled to visualize the determined process quantity, i.e. the filling level, by means of a color progression, as is indicated in the different views A, B and C by means of a different graphical filling of the display means 21.

In view A, there is no medium 22 in the container 18. In this state, the display means 21 may visualize a green color, for example. In view B, the medium 22 fills about half of the container 18. The display means 21 may visualize an orange color, for example. In view B, the medium 22 reaches its maximum filling level within the container 18. In this operational state, the display means 21 may visualize a red color, for example. On the whole, the display means 21 can depict a continuous color progression from green to red, depending on the current filling level of the medium 22 in the container 18.

Moreover, the display means 21 may be configured and controlled for depicting different media (not shown) in the container 18 by different colors or different color progressions.

The display means 4 visualizes an operational state of the field device 20, as was essentially already described in the case of the field devices 1, 10 and 15.

The display means 4, 21 may be configured as a multi-color lighting means, preferably as a multi-color light-emitting diode or organic multi-color light-emitting diode. Particularly preferably, the multi-color light-emitting diode is an RGB light-emitting diode, without, however, being strictly limited thereto. The multi-color lighting means may also be configured in the shape of a ring or ring-segment-shaped (color) display.

The field device according to the invention disclosed herein and the method according to the invention disclosed herein are not limited to the embodiments respectively described herein, but also include embodiments having the same effects, which result from technically viable other combinations of the features of the field device and the method described herein. In particular, the features and combinations of features mentioned above in the general description and the description of the Figures and/or shown in the Figures alone can be used not only in the combinations explicitly specified herein, but also in other combinations or on their own, without departing from the scope of the present invention.

In a preferred implementation, the field device according to the invention is used for the measurement of the filling level, limit level, viscosity or pressure of a solid, liquid or gaseous medium.

LIST OF REFERENCE NUMBERS

1 Field device
2 Display means for the visualization of a process quantity
3 Display means for the visualization of a process quantity
4 Display means for the visualization of an operational status
5 Housing
6 Limit level sensor
10 Field device
11 Display
12 Pressure sensor
15 Field device 16 Display means for the visualization of a process quantity
17 Filling level sensor
18 Container
20 Field device
21 Display means for the visualization of a process quantity
22 Medium Unless indicated otherwise, identical reference numbers in the figures identify identical components with the same function. The terms drive unit and drive are used interchangeably herein.

The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable equivalents.

It must be noted that the features cited individually in the claims can be combined with each other in any technologically meaningful manner (also across the boundaries of categories, such as method and device) and represent other embodiments of the invention. The description, in particular in connection with the figures, additionally characterizes and specifies the invention.

It may also be noted that a conjunction "and/or" used hereinafter, which is situated between two features and links them to each other, should always be interpreted such that, in a first embodiment of the subject matter according to the invention, only the first feature may be provided, in a second embodiment, only the second feature may be provided, and in a third embodiment, both the first and the second feature may be provided.

We claim:

1. A field device with display means for the visual representation of states determined by the field device, wherein at least two display means are provided, which are each configured in a ring-shaped or ring-segment-shaped manner and are disposed on a housing so as to extend on an outer circumference thereof.

2. The field device of claim 1, wherein an angular extent of the ring-segment-shaped display means is at least 120°.

3. The field device of claim 1, wherein the display means is configured as a multi-color lighting means.

4. The field device of claim 3, wherein the multi-color lighting means is an RGB light-emitting diode.

5. The field device of claim 3, wherein the display means is configured and controlled to visualize the determined states by means of a color progression or by means of different colors assigned to the respectively determined states.

6. The field device of claim 1, further comprising at least one sensor for determining a process quantity, wherein at least one of the display means is configured and controlled to visualize a state of the determined process quantity.

7. The field device of claim 6, wherein the sensor is a limit level sensor, a pressure sensor or a filling level sensor.

8. The field device of claim 7, wherein the limit level sensor is configured for differentiating between at least two different media, wherein one of the display means is configured and controlled to visualize whether a first or a second medium is detected, and the other display means is configured and controlled to visualize whether no or a medium other than the first or second medium is detected.

9. The field device of claim 7, wherein the pressure sensor is configured to differentiate between several switching points depending on detected pressure, wherein one of the display means is configured and controlled to visualize each of the several switching points by means of different colors.

10. The field device of claim 6, wherein the filling level sensor is configured for determining an interface layer between at least two media, wherein several of the display means are configured and disposed together and controlled to visualize the detected overall filling level in a continuous or graded representation including the interface layer.

11. The field device of claim 1, wherein at least one of the display means is configured and controlled to visualize an operational status and/or one or several switching states of the field device.

12. A method for the visual representation of states determined by a field device, wherein the field device has display means, the method comprising: visualizing the determined states by means of at least two display means that are each configured in a ring-shaped or ring-segment-shaped manner and are disposed on a housing so as to extend on an outer circumference thereof.

13. The method of claim 12, wherein the determined states are visualized by at least one of the display means by means of a color progression or by means of different colors assigned to the respective states.

14. The method of claim 12, wherein a process quantity is determined by means of at least one sensor, and the state of the determined process quantity is visualized by at least one of the display means.

* * * * *